(12) United States Patent
Yamaguchi et al.

(10) Patent No.: US 6,902,640 B2
(45) Date of Patent: Jun. 7, 2005

(54) METHOD FOR MANUFACTURING A BELT

(75) Inventors: Shin-ichi Yamaguchi, Kodaira (JP); Hiroyuki Asano, Tsurugashima (JP); Masateru Fujimori, Shizuoka-ken (JP)

(73) Assignee: Kokoku Intech, Ltd., Tokyo (JP)

( * ) Notice: Subject to any disclaimer, the term of this patent is extended or adjusted under 35 U.S.C. 154(b) by 138 days.

(21) Appl. No.: 10/032,741

(22) Filed: Oct. 22, 2001

(65) Prior Publication Data

US 2002/0053393 A1 May 9, 2002

(30) Foreign Application Priority Data

Oct. 31, 2000 (JP) ........................................ 2000-332788

(51) Int. Cl.⁷ .............................................. B29C 53/00
(52) U.S. Cl. ..................... 156/218; 156/137; 156/304.6; 428/36.91
(58) Field of Search .......................... 156/74, 137, 218, 156/304.1, 304.6; 425/34.2, 39; 428/36.91

(56) References Cited

U.S. PATENT DOCUMENTS

| | | | | |
|---|---|---|---|---|
| 3,455,758 A | * | 7/1969 | Straughan | 156/215 |
| 3,834,257 A | * | 9/1974 | Ganser | 82/169 |
| 3,964,846 A | * | 6/1976 | Bliss | 425/28.1 |
| 4,896,765 A | * | 1/1990 | Loose | 198/847 |
| 5,140,375 A | * | 8/1992 | Shindo et al. | 399/45 |
| 5,630,770 A | * | 5/1997 | Fujiwara et al. | 417/326 |
| 5,733,399 A | * | 3/1998 | Wood | 156/138 |
| 6,217,964 B1 | * | 4/2001 | Ndebi et al. | 428/36.91 |
| 6,409,621 B1 | * | 6/2002 | Billups et al. | 474/263 |

FOREIGN PATENT DOCUMENTS

| | | | | |
|---|---|---|---|---|
| JP | 02066009 A | * | 3/1990 | ........... B65G/15/32 |
| JP | 6-250537 | | 9/1994 | |
| JP | 11 130221 | | 5/1999 | |
| JP | 11-130221 | | 5/1999 | |
| JP | 11-227063 | | 8/1999 | |
| JP | 2000-35723 | | 2/2000 | |

OTHER PUBLICATIONS

English abstract of JP 02066009.*

* cited by examiner

Primary Examiner—Jeff H. Aftergut
Assistant Examiner—John L. Goff
(74) Attorney, Agent, or Firm—Carella, Byrne, Bain et al.; Elliot Olstein; William Squire

(57) ABSTRACT

The objective of the present invention is to provide a method and apparatus for manufacturing an intermediate transfer belt and a fixing belt with high quality used in copying machines, printers and the like.

An unvulcanized rubber is formed into a sheet and adhered to a resin film with low stretchability forming a seamless laminate. The laminate is formed into a cylindrical form where the solid rubber sheet is arranged outside of the resin film or vice versa. The cylindrical composite is placed between an outer casing mold and a core mold. A pneumatic pressure is applied to the cylindrical composite outside of the core mold for vulcanizing the rubber and adhering the rubber to the resin film so as to form a laminated cylinder into one piece.

2 Claims, 3 Drawing Sheets

1: Base Plate
2: Outer Casing Mold
3: Core Mold
4: Air Bag
5: Unvulcanized Rubber
6: Resin Film
7: Vulcanizing Room 1: Base Plate
2: Outer Casing Mold
3: Core Mold
4: Air Bag
5: Unvulcanized Rubber
6: Resin Film
7: Vulcanizing Room

FIG. 4
| | | |
|---|---|---|
| Rubber Hardness (JIS A) | | 50 |
| Dimension | Width mm | 348 |
| | Inner Periphery Length mm | 526 |
| | Thickness mm | 0.60~0.63 |
| Surface Resistance | Front (Coated) Side | $1 \times 10^{11} \, \Omega/\square$ |
| | Rear (Resin Film) Side | $1 \times 10^{10} \, \Omega/\square$ |
FIG. 5
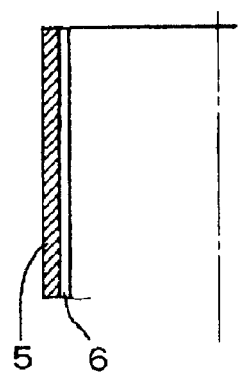
(a)
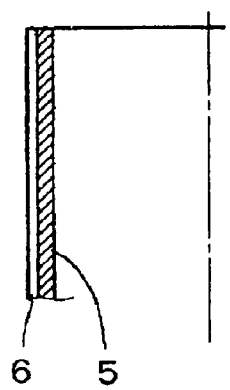
(b)
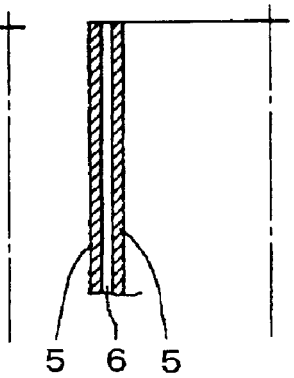
(c)
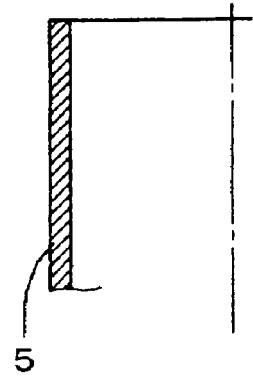
(d)

METHOD FOR MANUFACTURING A BELT

BACKGROUND OF THE INVENTION

1. Field of the Invention

The present invention relates to a manufacturing method of belts applicable to intermediate transfer belts or fixing belts for copying machines, printers and so forth, and relates to a manufacturing apparatus of these belts.

2. Brief Description of the Related Art

In electro-photographic copying machines and printers, belts are used for transferring or fixing toners. Usually, these belts are formed out of resins with a low stretchability and sometimes they bear coated layers.

Since the above-mentioned conventional belts are usually formed out of only resins with no elastic layers, their shapes and sizes are limited, consequently, their applicable areas are limited.

SUMMARY OF THE INVENTION

The present invention is carried out in view of the above-mentioned problems and its objective is to provide a method for manufacturing a belt having no limitation in shape and size, but with high quality.

An aspect of the present invention includes a method for manufacturing a belt comprising the steps of, forming a solid rubber sheet, laying the solid rubber sheet onto a seamless substrate film, abutting both ends of the rubber sheet to form a cylindrical composite, and placing the cylindrical composite between an outer casing mold and a core mold where either the solid rubber sheet or the seamless substrate-film faces radially inwardly. The method further includes applying a pneumatic pressure to the cylindrical composite for vulcanizing the rubber sheet and for adhering the rubber sheet to the substrate film to form a one piece laminated cylinder.

In a further aspect of the method for manufacturing the belt a coated layer is formed on the outer surface of the belt.

BRIEF DESCRIPTION OF DRAWINGS

FIG. 4 is a chart showing characteristic data of a product according to the present embodiment.

FIG. 5 shows cross-sectional views of belts according to the present embodiment.

DETAILED DESCRIPTION OF PREFERRED EMBODIMENTS

Hereinafter the embodiment according to the present invention is described by referring to drawings. In the present embodiment, the manufacturing method and apparatus of intermediate transfer belts and fixing belts used in color copying machines, color printers and the like are explained.

Figure 1:
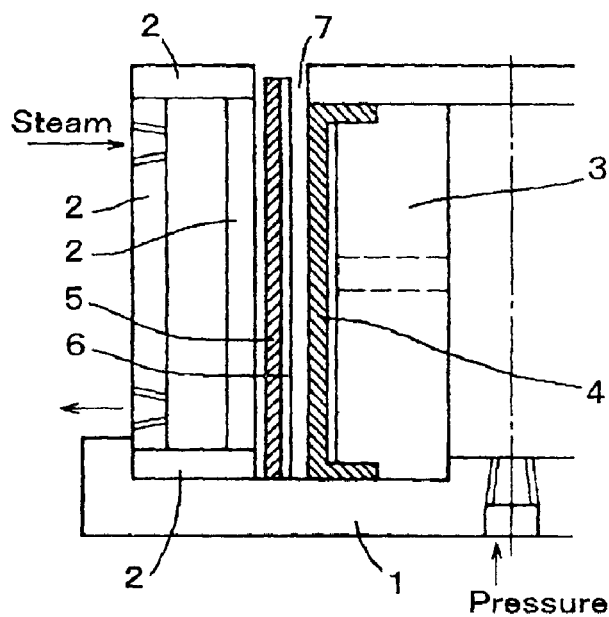
FIG. 1 is a cross-sectional view showing an outline arrangement of a vulcanizing apparatus according to an embodiment of the present invention.

FIG. 1 is the cross-sectional view showing the outline arrangement of the vulcanizing apparatus used in manufacturing the belt according to the present embodiment.

In the figure, reference numeral "1" is a base plate placed on the bottom of the apparatus, "2" is an outer casing mold as a cylindrical outer die and "3" is a core mold as an inner die. A reference numeral "4" is an air bag for applying a pneumatic pressure from outside of the core mold 3 to an unvulcanized rubber 5 as a cylindrical solid sheet and a resin film 6 as a cylindrical seamless sheet base, arranged between the outer casing mold 2 and the core mold 3. A reference numeral "7" is a vulcanizing chamber for vulcanizing the unvulcanized rubber 5 and adhering it to the resin film 6 so as to be formed in one piece by applying the pneumatic pressure from the air bag 4.

In the present embodiment, the resin film 6 with low elasticity, namely, not stretchable or hard to stretch, is used as a substrate and rubber elastic layers are applied to either the outer side, the inner side, or both sides of the resin film, consequently to be formed in one piece. The solid rubber is used for these elastic layers, however liquid or paste rubber is not used for these elastic layers. The applied pneumatic pressure generated by expanding the air bag 4 forms the solid rubber and the resin film into one piece.

The unvulcanized rubber 5 precisely formed in sheet form by calender rollers and the like is used as an outer layer for the belt. The rubber layer is later vulcanized to a seamless resin sheet. Since the vulcanized rubber belt bears smooth surfaces attributed to the forming method, the belt is employable without polishing, since the dispersion value in the thickness of the rubber 5 sheet can be kept less than 0.04 mm.

Figure 3:
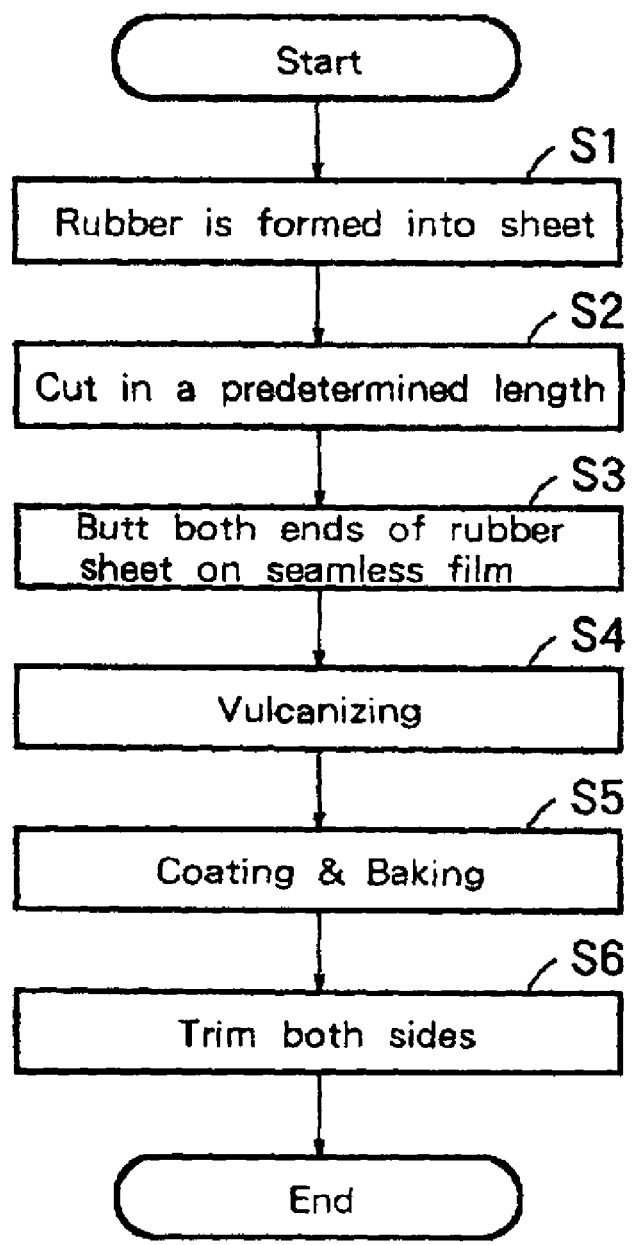
FIG. 3 is a flow chart showing a manufacturing process of the embodiment.

A manufacturing procedure of the intermediate transfer belt is explained step by step by referring to a process chart shown in FIG. 3.

(Step S1) A CR rubber is formed into a sheet by calender rollers. Dimensions of the sheet, for example, are as follows: Width: 400 mm; Thickness: 0.48±0.02 mm.

(Step S2) The sheet rubber is cut in a predetermined length, for example, 528±1 mm.

Figure 2:
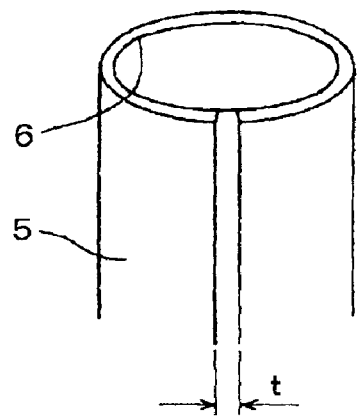
FIG. 2 is a perspective view illustrating a state where both ends of a rubber sheet and a seamless resin film are laminated and butted so as to be formed into a one piece cylindrical body.

(Step S3) The cut rubber sheet and a seamless film are laminated and both cut ends of cut rubber sheet are butted together with a seamless film so as to form a cylindrical shape. A distance "t" between both ends of the rubber sheet is kept 0 to 2 mm as shown in FIG. 2 so as to keep uniform thickness all over the cylindrically shaped rubber sheet.

(Step S4) The butted cylindrical unvulcanized rubber is placed in the vulcanizing apparatus shown in FIG. 1 and vulcanized.

(Step S5) The outer surface of the vulcanized cylindrical rubber is coated by spraying a fluoride coating material with thickness by 6µ and baked.

(Step S6) Both ends of the coated and baked cylindrical rubber is trimmed, thus the intermediate transfer belt with predetermined dimensions is obtained.

Properties of the belt obtained by the abovementioned procedure are shown in FIG. 4.

The present embodiment can provide the belt with high quality without any limitations in its shape and dimension.

Any seamless film can be used as the substrate without any limitations in materials and dimensions. A plain weave fabric can also be used as the substrate in place of the resin film. Any rubber material can be used as a sheet material for the belt.

The vulcanizing apparatus is capable of manufacturing belts (a) to (d) depicted in FIG. 5. In belt (a) a rubber layer is arranged at the outside of the belt. In belt (b) a rubber layer is arranged at the inside of the belt. In belt (c) rubber layers are arranged at both sides of the belt. The apparatus is also capable of manufacturing belt (d) formed out of only the rubber.

As explained above, the present invention can easily provide the belt with high quality without any limitations in its shape and dimension.

What is claimed is:

1. A method for manufacturing a belt comprising the steps of:

forming an elastic solid rubber sheet having a maximum thickness dispersion value of 0.04 mm;

laying said solid rubber sheet onto a seamless resin substrate with relatively low elasticity while abutting both ends of said rubber sheet to form a layered cylinder;

placing said layered cylinder between an outer casing mold and a core mold where said seamless substrate faces radially inwardly; and applying a pneumatic pressure to said layered cylinder for vulcanizing said rubber sheet and for adhering said rubber sheet to said substrate to form a one piece two layer cylinder.

2. The method of manufacturing a belt according to claim 1 including forming a coated layer on the outer surface of said adhered one piece two layer cylinder.

* * * * *